April 25, 1939.    A. H. GOLDSWORTHY    2,155,897
ROLLER BEARING
Filed Aug. 28, 1936

INVENTOR:
A. H. Goldsworthy
by Candler & Gravely
HIS ATTORNEYS.

Patented Apr. 25, 1939

2,155,897

UNITED STATES PATENT OFFICE 2,155,897

ROLLER BEARING

Albert H. Goldsworthy, Canton, Ohio, assignor to The Timken Roller Bearing Company, Canton, Ohio, a corporation of Ohio Application August 28, 1936, Serial No. 98,275

3 Claims. (Cl. 308—214)

My invention relates to taper roller bearings of the self-contained type and has for its principal object to provide means within the bearing itself to counteract the tendency of the cup or outer bearing member to become separated from the rollers, which separation would reduce the radial load capacity of the bearing.

The invention consists principally in mounting at the small end of the cone or inner bearing member a thrust plate and interposing a series of tapered thrust rollers between said thrust plate and the adjacent end of the cup or outer bearing member, such thrust rollers being disposed with their large ends outwardly so as to have the effect of maintaining the cup or outer bearing member in proper running position on the main rollers. The invention further consists in the roller bearing and in the parts and combinations and arrangements of parts hereinafter described and claimed.

In the accompanying drawing.

Figure 1:
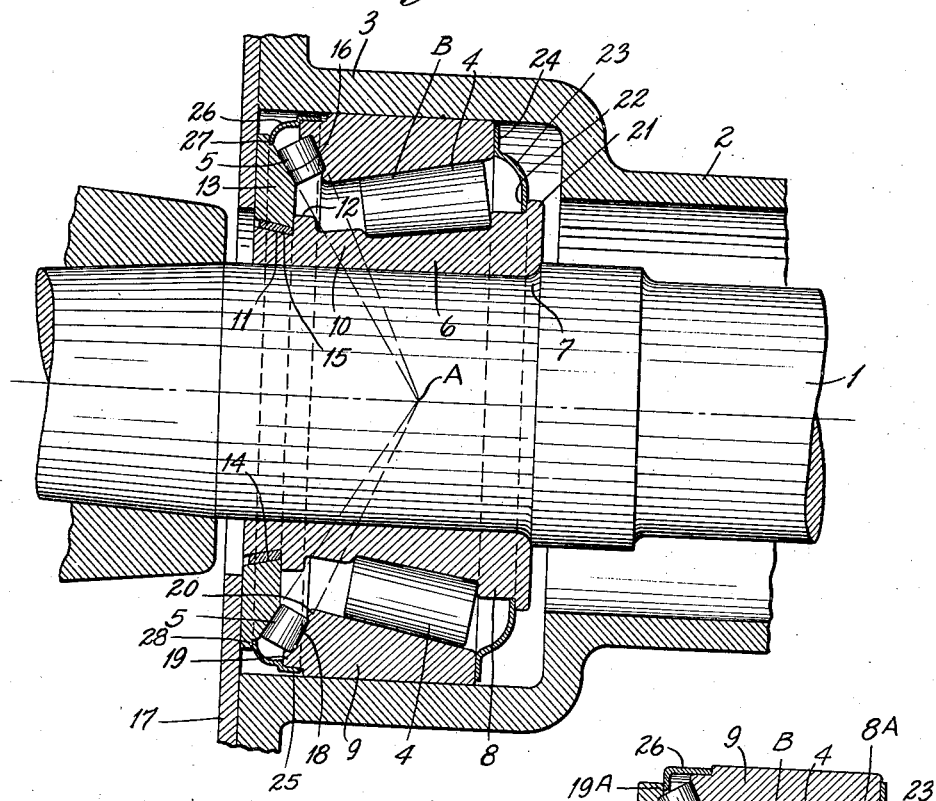
Fig. 1 is a longitudinal sectional view of a roller bearing embodying my invention mounted in an automobile drive axle.

The drawing illustrates an automobile drive axle of the fixed hub or semi-floating type, including an axle section 1, an axle housing 2 therefor terminating short of the end of the axle section, and a duplex taper roller bearing B interposed between the enlarged end 3 of the housing and the axle. Said bearing includes a main set of rollers 4 mounted primarily to carry radial load, that is, disposed at a relatively low angle, and a secondary set of rollers 5 mounted after the fashion of a thrust bearing, that is, at a relatively steep angle.

The bearing mounting is of the direct type, that is, the small ends of the main rollers 4 are disposed outwardly of the axle 1 and the large end of the cone or inner bearing member 6 is mounted against a shoulder 7 on the axle. The cone 6 is provided with a thrust rib 8 for the large ends of the conical rollers 4 and the cup 9 or outer bearing member for said rollers is mounted in the enlarged end 3 of the axle housing 2.

The cone 6 has a projecting sleeve portion 10 that extends beyond the outer end of the bearing cup 9, said outer end portion having a conical periphery 11 that tapers inwardly from the outer end of said sleeve portion and there is an outstanding radial flange 12 at the small inner end of said conical portion 11. An annular thrust plate 13 has a central tapered opening 14 larger than said conical portion of said sleeve and substantially parallel therewith, the thrust plate being held on said sleeve 10 by means of a ring 15 of soft metal pressed into the conical space between the two members. A suitable closure plate 17 secured to the end of the housing holds the thrust plate and bearing in position.

The outer peripheral portion 16 of the inner face of said thrust plate is of conical shape with its apex A on the axis of the bearing, said conical portion 16 constituting a raceway for said secondary series of taper bearing rollers 5 which are arranged with their apexes coincident with the apex of said conical raceway 16. The opposed end face of the bearing cup 9 is provided with a conical raceway 18 for said rollers, with a thrust rib 19 for the large outer ends of said rollers and with a retaining rib 20 for the small inner ends of said rollers.

At the innermost end of said bearing cone 6 is an upstanding radial flange 21 against which is disposed the inner peripheral portion 22 of a curved sealing ring 23 which has a flat peripheral flange 24 disposed flatwise against the innermost end face of the bearing cup 9. A seal for the outer end of the bearing comprises a sleeve 25 mounted on a rabbeted shoulder portion at the end of the bearing cup and having a curved portion 26 whose inner peripheral portion 27 fits in a rabbeted portion 28 in the outer periphery of the inner face of the thrust plate 13.

Figures 2, 3:
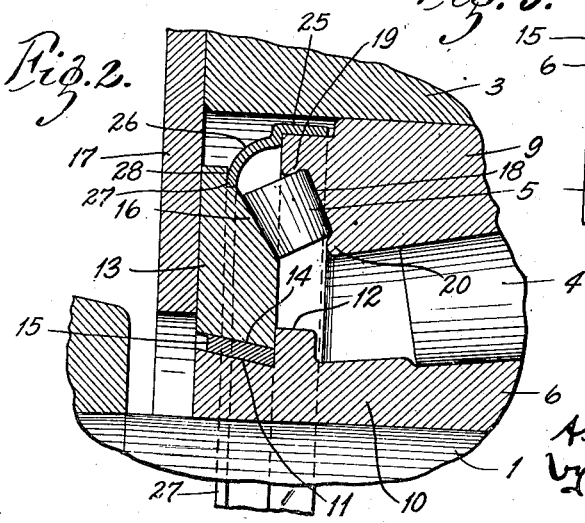
Fig. 2 is a similar view on a large scale of one end portion of the bearing.
Fig. 3 is a similar view of a slight modification.

In the modification shown in Fig. 3, the thrust rib 8a for the rollers is in the cup 9, instead of on the cone, and the thrust rib 19a for the secondary rollers is on the thrust plate 13, instead of on the end of the cup 9, the construction being otherwise the same as Fig. 1.

By the above arrangement, the thrust bearing portion of the bearing holds the bearing cup in proper running position on the main bearing, preventing separation of the bearing cup from the rollers which would reduce the capacity of the bearing for carrying radial load. The closure members make the bearing entirely sealed and self-contained.

What I claim is:

1. A taper roller bearing comprising an inner bearing member having a conical raceway and a sleeve portion projecting beyond the small end of said raceway, said sleeve having a radial rib spaced from the end thereof, an outer bearing member having a conical raceway, conical rollers between said inner and outer bearing members, an annular plate secured on said sleeve against said rib, said plate having a conical raceway portion facing the end of said outer bearing member, the end face of said outer bearing member having a conical raceway portion and a series of conical rollers between said two last mentioned raceway portions, the axes of said rollers being disposed obliquely with respect to the main axis of the bearing whereby said rollers carry radial load and thrust load along the main axis of the bearing.

2. A taper roller bearing comprising an inner bearing member having a conical raceway and a sleeve portion projecting beyond the small end of said raceway, said sleeve having a radial rib spaced from the end thereof, an outer bearing member having a conical raceway, conical rollers between said inner and outer bearing members, an annular plate secured on said sleeve against said rib, said plate having a conical raceway portion facing the end of said outer bearing member, the end face of said outer bearing member having a conical raceway portion, a series of conical rollers between said two last mentioned raceway portions and closures for the ends of said bearing, the axes of said rollers being disposed obliquely with respect to the main axis of the bearing whereby said rollers carry radial load and thrust load along the main axis of the bearing.

3. A taper roller bearing comprising an inner bearing member having a conical raceway and a sleeve portion projecting beyond the small end of said raceway, said sleeve having a radial rib spaced from the end thereof, an outer bearing member having a conical raceway, conical rollers between said inner and outer bearing members, an annular plate secured on said sleeve against said rib, said plate having a conical raceway portion facing the end of said outer bearing member, said outer bearing member having a conical raceway portion, a series of conical rollers between said two last mentioned raceway portions, the axes of said rollers being disposed obliquely with respect to the main axis of the bearing whereby said rollers carry radial load and thrust load along the main axis of the bearing, said cup having a rabbeted portion adjacent to said last mentioned rollers and a sealing sleeve mounted on said rabbeted portion and having an inwardly flanged portion extending into engagement with said thrust plate.

ALBERT H. GOLDSWORTHY.